United States Patent
Devitt

[11] 4,052,534
[45] Oct. 4, 1977

[54] BATTERY VENT PLUG
[75] Inventor: John L. Devitt, Denver, Colo.
[73] Assignee: General Battery Corporation, Reading, Pa.
[21] Appl. No.: 356,826
[22] Filed: May 3, 1973
[51] Int. Cl.² .............................................. H01M 2/12
[52] U.S. Cl. ..................................... 429/86; 429/54; 429/89
[58] Field of Search .................. 136/177, 178; 429/54, 429/86, 87, 88, 89

[56] References Cited
U.S. PATENT DOCUMENTS

| 789,877 | 5/1905 | Perry | 136/178 |
| 1,366,298 | 1/1921 | Teitelbaum | 136/178 |
| 1,732,158 | 10/1929 | Ford | 136/178 |
| 2,690,466 | 9/1954 | Kendall et al. | 136/178 |
| 2,743,035 | 4/1956 | Fogarty | 136/177 X |
| 2,896,007 | 7/1959 | Buskirk | 136/177 |
| 3,218,198 | 11/1965 | Havlick | 429/88 |
| 3,398,026 | 8/1968 | Andre | 136/178 |
| 3,507,708 | 4/1970 | Vignaud | 429/86 |
| 3,560,266 | 2/1971 | Mossford | 136/177 |
| 3,615,868 | 10/1971 | Melone | 136/178 |
| 3,664,875 | 5/1972 | Graf | 136/178 |
| 3,671,325 | 6/1972 | Mocas | 136/178 |
| 3,904,441 | 9/1975 | Badger | 429/86 |

FOREIGN PATENT DOCUMENTS

| 152,854 | 8/1953 | Australia | 429/86 |
| 706,854 | 6/1931 | France | 429/86 |
| 2,413,638 | 10/1974 | Germany | 429/86 |
| 460,273 | 5/1928 | Germany | 136/178 |
| 799,217 | 8/1958 | United Kingdom | 136/177 |
| 319,198 | 9/1929 | United Kingdom | 429/86 |
| 1,002,194 | 8/1965 | United Kingdom | 429/89 |

Primary Examiner—Donald L. Walton
Attorney, Agent, or Firm—Benasutti Associates, Ltd.

[57] ABSTRACT

Various improved battery vent plugs utilizing a slit resilient acid-resistant diaphragm bi-directional valve which opens temporarily automatically under gaseous pressure serve to minimize battery fluid loss.

1 Claim, 7 Drawing Figures

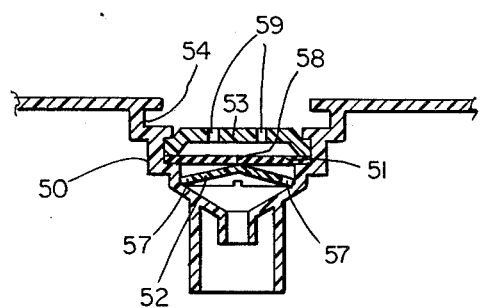
_Fig. 5_
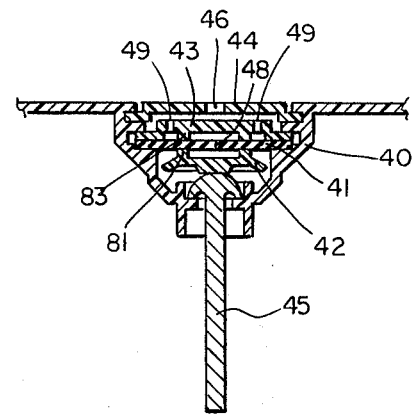
_Fig. 4_
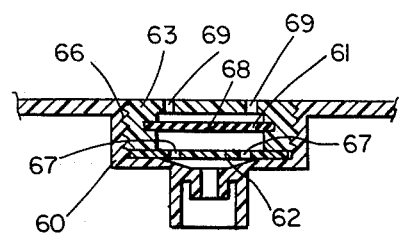
_Fig. 6_
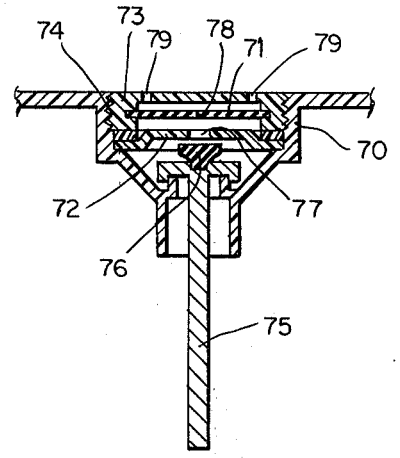
_Fig. 7_

BATTERY VENT PLUG

BACKGROUND OF THE INVENTION

This invention relates to battery vent plugs and more particularly to battery vent plugs for lead-acid storage batteries.

One of the disappointing characteristics of present day lead-acid storage batteries is the necessity for frequent continuing maintenance to keep the fluid level within the individual battery cells at their proper level by adding more water from time to time. The fluid within the battery cells decreases continuously through evaporation and the entrainment of fluid by escaping gases generated within the battery, more importantly the latter. It is generally not feasible to permanently seal present day batteries to prevent loss of battery fluid, since gas generated within the battery, mainly $H_2$ and $O_2$, has to be vented to ambient atmosphere for safety reasons. The problem posed, then, is to permit the venting of the gas generated within the battery easily, and yet minimize the loss of battery fluid which escapes the battery through the vents as gas-entrained droplets. The more the loss of battery fluid in this manner is minimized, the more one approaches a maintenance-free battery.

SUMMARY OF THE INVENTION

Accordingly, it is an object of this invention to provide a more maintenance-free battery by minimizing the loss of gas-entrained battery fluid through the battery vents.

It is an object of this invention to provide a battery vent plug adapted to minimize the loss of gas-entrained battery fluid, while yet freely permitting the escape of generated gases.

It is an object of this invention to provide a method whereby the loss of gas-entrained battery fluid through the battery vents is minimized.

It is an object of this invention to provide various types of battery vent plugs, adapted for different purposes, that all minimize the loss of battery fluid.

It is an object of this invention to provide an improved self-venting battery.

These and other objects of the invention are attained with a battery vent plug construction utilizing a slit natural rubber or resilient acid-resistant rubber-like diaphragm valve to vent gases generated within the battery to ambient atmosphere. The valve, normally closed, opens only upon a build-up of gaseous pressure, and then closes once the pressure has been released. Since the plug is not continually open to atmosphere, but only for brief intermittent periods of time, gas-entrained droplets of battery fluid do not continually escape the battery, and thus the need for frequent maintenance to keep the battery fluid at its proper level is greatly minimized. The interior space of the battery vent plug immediately below the valve provides a space where gas-entrained droplets of battery fluid can condense and drip back into the interior of the battery cell during the period sufficient gaseous pressure to open the valve is being build-up.

The self-venting valve of this invention is bi-directional, being automatically responsive to pressure differentials in either direction. This aspect is of particular significance to those who live in the mountains on their periodic trips to the higher air-pressure lowlands, and for possible aircraft applications. Without a provision for venting in situations where ambient air pressure exceeds that within the battery, as was heretofor normally the case, possible weak points in the battery casing are subject to unnecessary stress, a point especially relevant with the thinner-wall plastic battery casings prevalent today.

The ability to accommodate variable rates of gas flow is another significant aspect of the present invention. Previously known battery vent caps generally had fixed vent openings, which resulted in the loss of undue battery fluid vapor at low vapor pressures. In the present invention, the extent to which the slit valve opens is directly proportional to the gaseous pressure exerted. A small pressure differential results in only a small opening, thus serving to further minimize battery fluid loss.

Several embodiments with various modifications are hereinafter described.

BRIEF DESCRIPTION OF THE DRAWINGS

FIG. 4 shows another embodiment of this invention, having an additional provision for preventing the loss of battery fluid upon tipping of the battery;

FIG. 5 shows another embodiment of this invention, of a type having a minimum number of parts;

FIG. 6 shows another embodiment of this invention, having provisions for being screwed into the battery casing and lying flush with it; and FIG. 7 shows another embodiment of this invention, of the type that screws in, lies flush, and has provisions guarding against loss of battery fluid upon upset of the battery.

DESCRIPTION OF THE PREFERRED EMBODIMENTS

Figure 1:
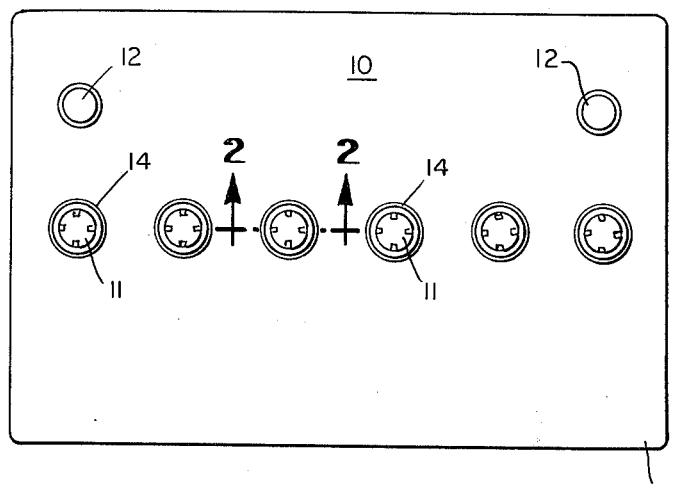
FIG. 1 is a top plan view of a common automobile-type lead-acid storage battery, showing the positive and negative terminals and six battery vent plugs disposed within the vent wells.

Referring to the figures, FIG. 1 shows the top of a typical automobile-type lead-acid storage battery 10, with battery terminals 12 and battery vent plugs 11 disposed within battery vent wells 14 in battery casing 13.

Figure 3:
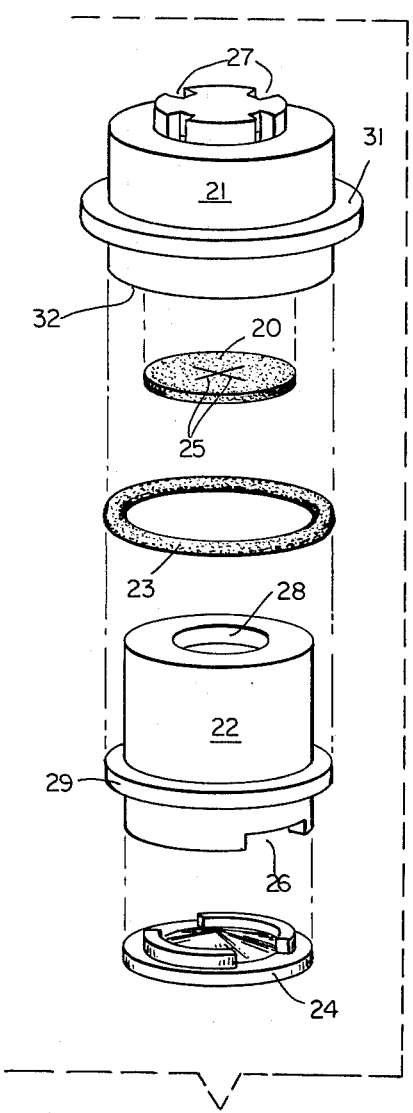
FIG. 3 is an exploded view of a basic embodiment of the battery vent plug of this invention shown in FIGS. 1 and 2.
Figure 2:
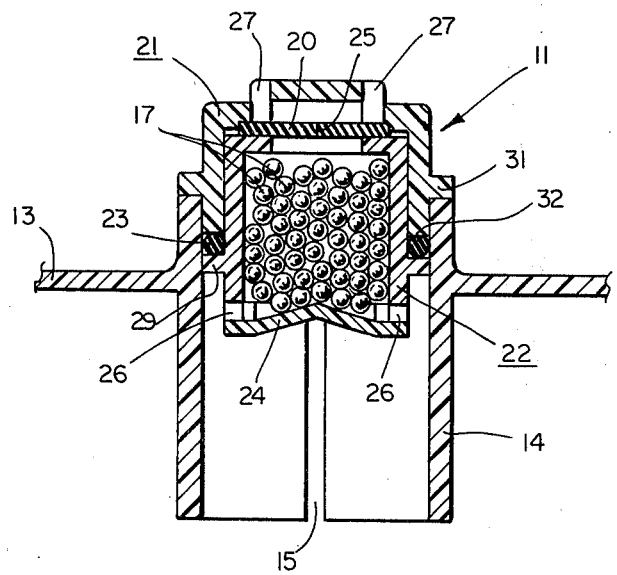
FIG. 2 is a cross-sectional view of a battery vent plug and the battery vent well of the battery casing in which it is disposed, taken along the line 2—2 of FIG. 1.

Normally, battery fluid electrolyte is lost for several reasons. At the sulfuric acid concentration commonly used in batteries, there is a more-or-less continuous evaporation of the water component of the electrolyte. In the event the battery becomes overheated for any reason the electrolyte may boil, an extreme case of evaporation. If the battery is shaken or jostled, it is generally possible for electrolyte battery fluid to splash out through the vent opening. Also, during charging and overcharging of the battery, normally some electrolyte battery fluid water is electrolytically decomposed into its constituents, hydrogen and oxygen, which pass through the vent to ambient atmosphere as gases; as the bubbles of gases reach the surface of the battery fluid electrolyte normally they burst, producing many droplets of fine spray which then becomes entrained with the hydrogen and oxygen gases and is carried out through the vent along with the evolved gas. The battery vent plug of this invention is designed to minimize battery fluid electrolyte loss from all of the above causes. As shown in FIGS. 2 and 3, FIG. 2 being a cross-section of the plug in a vent well and 3 being an exploded view, the preferred embodiment of the present invention consists of five main parts; slit resilient acid-resistant diaphragm valve 20, normally natural rubber; upper cylindrical member 21; lower cylindrical member 22; o-ring gasket 23, normally natural rubber; and splash baffle 24.

Splash baffle 24 may either be an integral part of lower cylindrical member 22 or it may be a separate distinct part as shown. The interior of lower cylindrical member 22 may be hollow, or alternatively filled with a suitable "packing" material such as the plastic beads 17 shown in FIG. 2. Slit rubber diaphragm valve 20 can either be wedged between upper cylindrical member 21 and lower cylindrical member 22 as shown, or can rest within depression 28 in lower cylindrical member 22, being held in place by the underside of the top surface of upper cylindrical member 21.

Splash baffle 24 prevents the splashing of liquid out through the battery vent plug caused by vehicle motion, or temperature rise and consequent rise in battery fluid electrolyte level. Splash orifices 26, in the lower cylindrical wall of lower cylindrical member 22, open horizontally into the interior of battery vent well 14 and thus are at right angles to the upward direction of any splashed battery liquid, which minimizes the entrance of splash droplets into lower cylindrical member 22. As positioned within battery vent well 14, splash orifices 26 are at a 90° angle to battery vent well slits 15, as is shown in FIG. 2, thus again minimizing the entrance of spray droplets. Also, gas-entrained droplets which have condensed on the inside wall of lower cylindrical member 22 drip back into the cell interior through these orifices 26. The inside surface of splash baffle 24 may be domed as shown in FIG. 3, or it may be flat.

The interior of lower cylindrical member 22 serves as a droplet catcher and vapor condenser. For maximum droplet recovery, the interior would be filled with a suitable "packing" material, such as the plastic beads 17 shown in FIG. 2. The purpose of the packing material is to provide a non-wetting surface upon which droplets may condense and drip back down toward the interior of the battery cell. To serve the same purpose, a series of staggered baffles could be placed within lower cylindrical member 22 to provide a tortuous passage for battery fluid electrolyte and gas-entrained liquid. Fiber glass wool would also serve the same purpose. The actual packing material used was "Teflon" plastic beads, which were non-wettable and thus eliminated the possibility of any capillary effect in the condensing droplets. Tests conducted showed that under normal conditions for this type of battery, packing material was not actually needed and did not result in a very significant improvement; but under more severe and extreme conditions its presence might become crucial.

Slit resilient acid-resistant diaphragm valve 20 is a two-way, low pressure vent valve normally of natural rubber of approximately 0.032 of an inch thickness. Two through-slits 25 cut with a razor blade at a 90° angle to one another provides valve action such that at approximately a one-half to one psi differential in either direction, the slits open to allow the passage of gas temporarily. Thus is prevented the random circulation of gas into and out of the battery cell, it allowing for the relief of gas pressure differentials which may develop due to the temperature changes, overcharging, or other factors. Actual tests showed that the valve generally opened between 0.6 and 1.0 psig; with an average of 0.835 psig. The rubber chosen for this particular embodiment had a Durometer measurement of approximately 50. The two slits 25 being at right angles greatly reduces the strain which occurs upon opening and closing so that the valve life is considerably lengthened. For normal usage, the arrangement and placement of slit resilient acid-resistant diaphragm valve 20 as shown in FIG. 2 is adequate; for more severe and extreme anticipated usage slit resilient acid-resistant diaphragm valve 20 would rest in depression 28 in the top surface of lower cylindrical member 22 while a ridge on the inside top surface of upper cylindrical member 21 would hold slit resilient acid-resistant diaphragm valve 20 securely in place in depression 28 so as to obviate any tendency for slits 25 to elongate by tearing.

The pressure range at which valve 20 opens was determined empirically to be optimum. Were valve 20 to open at less than $\frac{1}{2}$ psig, it would be opening far too often with far too much consequent battery fluid loss. Beyond 1 psig, the effective pressure limits of the battery casing are approached. With the thin plastic used in today's battery casings, even as little as 2 psig internal pressure has been known to produce a $\frac{1}{4}$ inch lateral distortion in the battery casing wall.

Under certain circumstances, for example, prolonged sustained high-speed driving, much internal gas is continuously generated within the battery. In such cases, valve 20 will be at least partially open for long extended periods of time. The material chosen for valve 20 must be of such a nature that a permanent set does not result from these severe conditions that would not allow the valve to return to a precise seal in the closed position. Natural rubber or a similar material generally provides sufficient resiliency for this purpose.

The embodiment of the present invention as shown in FIG. 3 has been designed for long term use in a long life battery such that it may be removed and battery fluid or water added when necessary, even though infrequently. For short life batteries, or one time use batteries or otherwise where it is not anticipated that fluid will ever again be added to the battery once initially used, a more permanent type of diaphragm may be used instead of the above slit resilient acid-resistant diaphragm valve. For instance, for the diaphragm of the battery vent plug of the present invention a gas-permeable, liquid-impermeable film might be utilized; such that the hydrogen and oxygen gases generated with the battery would be able to escape but battery fluid electrolyte would not. Or, a thin non-wettable microporous material having irregularly spaced microholes of a diameter small enough to prevent gas-entrained liquid droplets from passing therethrough, yet large enough to freely pass the generated gases might also be used.

O-ring 23, normally natural rubber, provides a gas-tight seal between the battery vent plug and the inside of the battery vent well of the battery casing in which the battery vent plug is positioned; but any other suitable gasket means would be acceptable. As assembled, o-ring 23 rests on the outside cylindrical surface of lower cylindrical member 22 on top of ridge 29 of lower cylindrical member 22, and under lower surface 32 of the cylindrical wall of upper cylindrical member 21. As shown in FIG. 2, ridge 31 of upper cylindrical member 21 rests upon the top surface of battery vent well 14. This arrangement is arbitrary, and any suitable means of positioning the battery vent plug of the present invention within a battery vent well, such as a force fit, would be entirely acceptable. In the case of a force fit, ridge 31 would be eliminated. Also, the particular configuration of the top surface of upper cylindrical member 21 as shown in FIG. 3 is arbitrary. For applications in which a top surface flush with the battery casing would be desired, the top of upper cylindrical member 31 would be flat with a hole or holes communicating directly into the interior.

Various other modifications of the battery vent plug of the present invention are shown in FIGS. 4–7.

FIG. 5 shows a battery vent plug assembly designed to have a minimum number of parts. Splash baffle 52 having a plurality of holes 57 sits lowest in a battery vent well 50. Immediately above it lies slit resilient acid-resistant diaphragm valve 51 with slits 58. Immediately above the slit resilient acid-resistant diaphragm valve is positioned valve protector 53 having a plurality of holes 59. Valve protector 53 is positioned within battery vent well 50 by means of a bayonet-type interaction. Provision is made by means of slots 54 immediately above valve protector 53 for an optional sliding cover which would cover all six battery vent wells of a battery.

FIG. 6 is a modification of FIG. 5, in that valve protector 63 screws into battery vent well 60 by means of corresponding threads 66. Valve protector 63, having a plurality of holes 69, also has sealed within it slit rubber diaphragm valve 61, with slits 68. Splash baffle 62 with holes 67 additionally acts as a gasket for screw-in valve protector 63.

In the embodiments of both FIG. 5 and FIG. 6 escaping gases rise within battery vent wells 50 and 60, travel through holes 57 and 67 in splash baffles 52 and 62, thence through slits 58 and 68 in slit resilient acid-resistant diagphragm valves 51 and 61, and thence through holes 59 and 69 of valve protectors 53 and 63, to ambient atmosphere.

FIG. 4 shows an embodiment modified to provide against the leakage of battery fluid electrolyte through the battery vent well upon tipping of the battery. Sitting lowermost in battery vent well 40 is lead pendulum 45 having a top cammed surface. Immediately above lead pendulum 45 is splash baffle 42 which rests on the top cam surface of lead pendulum 45. Splash baffle 42 has no holes, and is smaller in diameter than that part of battery vent well 40 in which it is positioned, so that gases rising through battery vent well 40 pass through the annular ring defined by the outside edge of splash baffle 42 and the inside wall of battery vent well 40. The top surface of splash baffle 42 is shaped into an annular ring 81 positioned such that it surrounds cross slits 48 of slit resilient acid-resistant diaphragm valve 41. A small gap exists between the top surface of annular ring 41 and the bottom surface of slit resilient acid-resistant diaphragm valve 41 which is not shown in FIG. 4. Slit resilient acid-resistant diaphragm valve 41 is positioned immediately above splash baffle 42. Immediately above slit resilient acid-resistant diaphragm valve 41 is valve protector 43 having a plurality of holes 49. Within the periphery of holes 49 in valve protector 43 is annular ring 83 corresponding in size to annular ring 81 of splash baffle 42. A small gap exists between the bottom surface of annular ring 83 and the top surface of slit resilient acid-resistant diaphragm valve 41. Immediately above valve protector 43 is sliding cover 44 which covers all six battery vent wells on the top of the battery casing. Generated gases normally rise within battery vent well 40 around lead pendulum 45, around splash baffle 42, through the gap above annular ring 81, through cross slits 48 of slit resilient acid-resistant diaphragm valve 41, then through the cap between annular ring 83 and resilient acid-resistant diaphragm valve 41, then through holes 49 of valve protector 43 and then out to ambient atmosphere through hole 46 in sliding cover 44. Upon a tipping of the battery, lead pendulum 45 remains vertical due to its weight, and its cammed top surface engages the bottom surface of splash baffle 42 forcing it upward slightly. This causes annular ring 81 to press firmly against the adjacent portion of slit resilient acid-resistant diaphragm valve 41 and forces slit resilient acid-resistant diaphragm valve 41 up against anular ring 83 of valve protector 43. Thus, cross slits 48 of slit resilient acid-resistant diaphragm valve 41 are completely surrounded by annular rings 81 and 83 and escaping liquid is trapped beneath slit resilient acid-resistant diaphragm valve 41 in the area of battery vent well 40 surrounding splash baffle 42. This condition exists until the battery returns from its tipped position to its normal position and the cammed surface of pendulum 45 swivels so as to allow splash baffle 42 to drop down a bit again, opening the passageway between annular ring 81 and cross slits 48 of slit resilient acid-resistant diaphragm valve 41.

FIG. 7 shows a slight modification of the embodiment of FIG. 4, this time designed primarily for prevention of battery fluid electrolyte loss during complete upset. Valve protector 73 is adapted to be screwed into battery vent well 70 by means of threads 74. Valve protector 73 has a plurality of holes 79 and contains sealed within it slit resilient acid-resistant diaphragm valve 71, with cross slits 78. Splash baffle 72 is positioned immediately below screw-in valve protector 73 and acts as a gasket for it in addition. Splash baffle 72 contains a centerhole 77 positioned directly above resilient acid-resistant sealing plug 76, normally natural rubber, which is attached securely to the top of pendulum 75. The normal flow of gases is up battery vent well 70, around pendulum 75 through hole 77 in splash baffle 72, then through cross slits 78 in slit resilient acid-resistant diaphragm valve 77, and then out hole 79 of screw-in valve protector 73. Upon upset of the battery, the weight of lead pendulum 75 forces it towards splash baffle 72 and positions resilient acid-resistant sealing plug 76 firmly against centerhole 77 of splash baffle 72 thereby trapping any battery fluid electrolyte beneath splash baffle 72 and preventing its escape.

It is apparent from the foregoing that various other modifications may be made in the details of construction, use, and operation of this invention, and yet still be within the spirit and scope of the present invention as defined in the following appended claims.

I claim:

1. A battery vent plug for insertion into at least one battery vent well to vent and otherwise seal said well, comprising: a hollow upper cylindrical member having a top surface with at least one vent aperture defined therein; a hollow lower cylindrical member having an upper surface defining at least one aperture in said upper surface, at least a portion of said lower cylindrical member being fitted within and matingly engaging the interior surface of said upper cylindrical member; a gas permeable diaphragm sealingly engaging said upper surface of said lower cylindrical member at least around said aperture defined therein, said diaphragm being retained between generally opposing surfaces of said cylindrical members; an o-ring gasket positioned around the outer cylindrical surface of said lower cylindrical member for engaging the interior walls of the battery case vent well to provide a gas-tight seal against said battery case vent well when said plug is disposed therein, said o-ring gasket having a greater diameter than that of said vent well so that upon insertion of said plug into said vent well said o-ring is compressed between said vent well and the remainder of said plug; and a retaining means for retaining said gasket with respect to said plug comprising an annular ridge formed on the exterior surface of said lower cylindrical member, said ridge cooperating with the lower end of said upper cylindrical member to retain said o-ring gasket therebetween.

* * * * *